United States Patent [19]

Borrelli et al.

[11] 4,360,441
[45] Nov. 23, 1982

[54] GLASS-ENCAPSULATED MAGNETIC MATERIALS AND METHODS FOR MAKING THEM

[75] Inventors: Nicholas F. Borrelli, Elmira; David L. Morse; Jan W. H. Schreurs, both of Corning, all of N.Y.

[73] Assignee: Corning Glass Works, Corning, N.Y.

[21] Appl. No.: 277,090

[22] Filed: Jun. 25, 1981

[51] Int. Cl.³ .................. C03C 3/30; C04B 35/26; C04B 35/28; C04B 35/32

[52] U.S. Cl. .................. 252/62.59; 252/62.56; 501/32; 501/54; 65/30.1

[58] Field of Search .................. 252/62.56, 62.59; 501/32, 54; 65/30.1, 33

[56] References Cited

U.S. PATENT DOCUMENTS

| | | | |
|---|---|---|---|
| 2,919,207 | 12/1959 | Scholzel | 427/129 |
| 3,015,627 | 1/1962 | Ayers et al. | 252/62.54 |
| 3,996,395 | 12/1976 | Chen et al. | 427/130 |
| 4,042,519 | 8/1977 | Weaver | 252/62.59 |
| 4,126,437 | 11/1978 | O'Horo | 252/62.59 |
| 4,140,645 | 2/1979 | Beall et al. | 252/62.59 |
| 4,150,173 | 4/1979 | Ziolo | 427/130 |
| 4,199,614 | 4/1980 | Ziolo | 106/304 |
| 4,233,169 | 11/1980 | Beall et al. | 252/62.59 |

*Primary Examiner*—Mark Bell
*Attorney, Agent, or Firm*—Kees van der Sterre

[57] ABSTRACT

Magnetic materials exhibiting ferrimagnetic and/or superparamagnetic behavior, produced by impregnating porous glasses with iron and, optionally, manganese, cobalt and nickel compounds, reacting the compounds with the porous glass to form bound complexes, heating the glass to expel unreacted organometallics, and further heating to convert the bound complexes to ferrimagnetic and/or superparamagnetic oxide crystallites, are described. Ferrimagnetic iron oxide crystallites exhibiting coercivities above 10,000 Oe can be made.

11 Claims, 3 Drawing Figures

GLASS-ENCAPSULATED MAGNETIC MATERIALS AND METHODS FOR MAKING THEM

BACKGROUND OF THE INVENTION

The present invention relates to magnetic materials, including a novel iron oxide-containing magnetic material exhibiting unusually high coercive force.

The magnetic properties of the ferrimagnetic iron oxides $Fe_3O_4$ and gamma-$Fe_2O_3$ have long been of interest for applications such as magnetic recording materials and the like. U.S. Pat. No. 2,694,656 discusses the preparation, physical characteristics and magnetic properties of these oxides and their use in the manufacture of magnetic tape recording materials.

Magnetic iron oxide may be prepared in bulk and subsequently applied to a suitable support or it may be produced in situ on the support. U.S. Pat. No. 2,919,207 discloses a process of the latter type wherein a ferrimagnetic coating is applied to a moving support directly from a vapor phase incorporating iron carbonyl.

The size and shape of the iron oxide particles are known to be factors affecting the magnetic properties thereof. U.S. Pat. No. 3,015,627 suggests that the size and shape of gamma-ferric oxide crystallites directly affect the coercivity and remanence of the bulk oxide.

Composition can also play an important role in determining the magnetic properties of iron oxides. As disclosed in U.S. Pat. No. 3,996,395, there is a range of composition in the system of gamma $Fe_2O_3$-$Fe_3O_4$ solid solutions wherein coercivities approaching 1000 Oe have been observed.

It has been proposed, for example in U.S. Pat. Nos. 4,150,173 and 4,199,614, to produce a porous glass-supported ferrimagnetic iron oxide material by the solution phase thermal decomposition of iron carbonyl in the presence of porous glass. The product is porous glass containing metallic iron, which can then be oxidized to gamma-$Fe_2O_3$ if desired. When oxidized, the product is characterized as a ferrimagnetic material with relatively small magnetic remanence and coercive force.

SUMMARY OF THE INVENTION

The present invention relates to magnetic materials exhibiting temperature dependent magnetic properties, ranging from superparamagnetism to unusual ferrimagnetism, and to methods for making them. The magnetic materials may be broadly characterized as glass-encapsulated iron oxides or iron oxide solid solutions, wherein the iron oxides are preferably present as gamma-$Fe_2O_3$, $Fe_3O_4$, or solid solutions thereof, in the form of well-dispersed crystallites having maximum diameters not exceeding about 0.05 microns. Crystalline ferrites selected from the group consisting of $MnFe_2O_4$, $CoFe_2O_4$ and $NiFe_2O_4$ may also be present. Typically the crystallites in the magnetic material of the invention will have diameters within the range of about 0.005–0.03 microns.

The ferrimagnetic materials of the invention are made by a low temperature reaction process. A porous glass support material having very small pore diameters is impregnated with an organometallic iron compound, and the organometallic compound is caused to react with the glass within the pores at temperatures below the organometallic decomposition temperature to form chemical bonds with the pore walls. The glass is then heated to expel unreacted organometallics, if any, and to convert the bound iron complexes present therein to non-metallic gamme-$Fe_2O_3$, $Fe_3O_4$, or solid solutions thereof. Preferably, the glass is heated to at least its consolidation temperature to seal or fully encapsulate the oxide crystallites produced by the heating within the glass. Thus the crystallites can be hermetically sealed into a consolidated, non-porous glass matrix.

The superparamagnetic materials of the invention, hereinafter sometimes referred to as mixed ferrite-containing materials, comprise at least one ferrite selected from the group consisting of $MnFe_2O_4$, $NiFe_2O_4$ and $CoFe_2O_4$ as a magnetic phase. These are made by the same low temperature process, but at least two organometallic compounds, including at least one compound of iron and one compound of Mn, Ni or Co, are introduced into the glass and photolyzed.

The products of the above-described methods exhibit unusual magnetic properties. For example, the iron oxide-containing materials can exhibit very high coercivity, with coercive forces of at least 1000 Oe, more typically several thousand Oe, having been observed.

The magnetic properties of the iron oxide-containing materials also exhibit unusual temperature dependence at temperatures well below the Curie temperatures of the magnetic phase. Above-ambient temperatures strongly reduce the magnetic remanence and coercivity of these materials, suggesting the onset of superparamagnetic behavior. The mixed ferrite-containing materials exhibit superparamagnetic behavior even at ambient temperatures and below. While not fully understood, these thermal properties are presently attributed to the small crystal size and high degree of dispersion of the magnetic phase.

BRIEF DESCRIPTION OF THE DRAWINGS

The invention may be further understood by reference to the drawings wherein.

DETAILED DESCRIPTION

Figure 1:
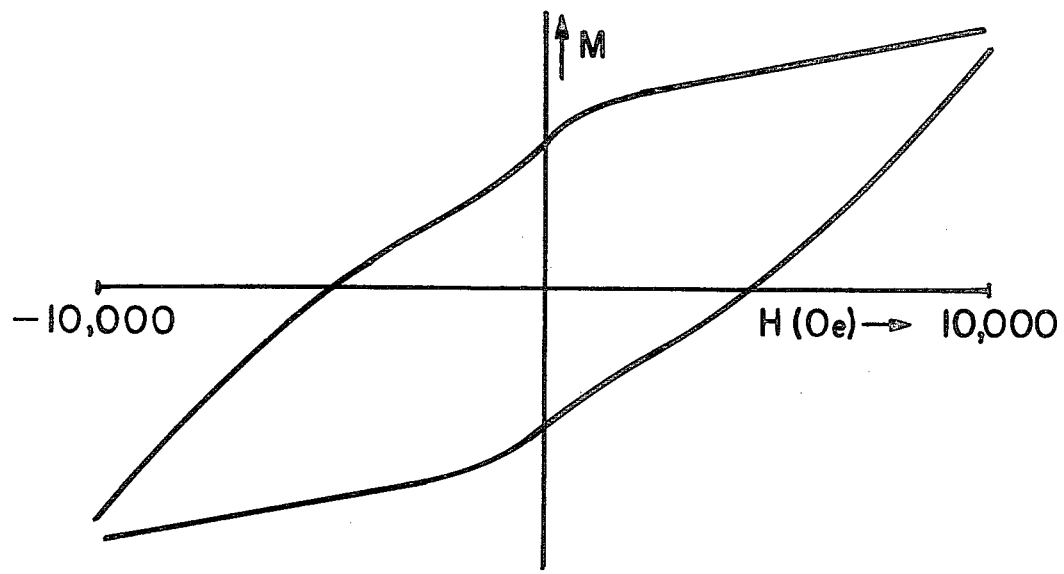
FIG. 1 illustrates the hysteresis exhibited by a ferrimagnetic material provided in accordance with the invention.

In carrying out the method of the invention, the porous glass to be used for impregnation with the organometallic compounds may be of the conventional type. Porous glasses are well known and can be produced by a number of different methods, including soot deposition as taught in U.S. Pat. No. 3,859,073 or, preferably, phase separation and leaching as taught in U.S. Pat. Nos. 4,110,093, 3,938,974, 2,106,744, 2,215,036 and 2,221,709.

The preferred porous glass for use in accordance with the invention is a high silica glass, meaning a glass containing at least about 90% silica by weight and more typically at least about 95% silica by weight. Porous glasses of this type produced by phase separation and leaching are available commercially, for example, from Corning Glass Works, Corning, NY 14831, being generically identified as 96% silica glasses and available under the VYCOR ® trademark, although the silica content thereof may vary somewhat from the 96% level. Porous glass sheets, rods, tubing or the like may be used for the impregnation operation or, alternatively, powdered porous glass can be used.

Organometallic compounds which can be used for porous glass impregnation include any of the known organometallics which can be made to undergo a reaction with porous glass without complete decomposition. As disclosed in the copending, commonly assigned patent application of N. F. Borrelli et al., Ser. No. 277,089, filed concurrently herewith and expressly incorporated herein by reference, iron, manganese and nickel organometallic compounds can be made to react with the pore walls of porous glasses via a complexing reaction to provide glass-bonded organometallic complexes. Subsequent heating drives off unreacted organometallics, but the complexes remain in the glass and, at higher temperatures, ultimately decompose to form a well-dispersed microcrystalline metal oxide phase.

While any reactive organometallic iron, manganese, cobalt or nickel compound may in principle be used, the preferred compounds from the standpoint of cost and availability are the organometallic carbonyls. Examples of such compounds would include [Fe(CO)$_5$], [Mn$_2$(CO)$_{10}$], [Co$_2$(CO)$_8$] and [Ni(CO)$_4$].

The selected organometallic compound can be loaded into porous glass in vapor form, if it is sufficiently stable at vaporization temperatures, or it can be loaded in liquid form either directly or in a suitable solvent. Among the solvents which can be used are methylene chloride, methanol, tetrahydrofuran, n-pentane or the like.

Two different techniques may be utilized in order to promote a low-temperature reaction between the organometallic iron compound and the pore walls of the glass. The first technique is to irradiate the glass with visible or ultraviolet light to photolytically induce bond scission and provide reactive intermediates for reaction with the glass. Compounds such as iron pentacarbonyl are readily photolyzable, undergoing bond scission on exposure to light of sufficient energy and forming reactive intermediates such as [Fe(CO)$_4$]$^+$ which readily react with hydroxyl groups present on the pore surfaces of porous glass.

An alternative method of promoting a low-temperature reaction between the organometallic compound and the glass is to treat the glass prior to impregnation to remove hydroxyl groups therefrom, typically by heating the glass to temperatures of 500° C. or above in a vacuum for several hours. The pore structure of the glass then contains siloxyl groups which will react with organometallic compounds such as iron pentacarbonyl as that compound is loaded into the glass. The organometallic iron is then bound to the glass and can be converted to iron oxide by heating.

Neither of the two described reaction techniques initially produces ferrimagnetic phases in the glass. Magnetometer tests provide no indication of any form of cooperative magnetism at this stage of the process, confirming that the reaction produces neither free metal nor magnetic oxides.

As noted in the aforementioned Borrelli et al. patent application concurrently filed herewith, the use of ultraviolet or visible light to photolyze organometallic iron present in the glass is advantageous for the reason that optical patterns can be generated in the glass by this technique. In the case of the present invention, such a method would permit the formation of a magnetic pattern in a porous glass article or the like. However, for many applications, patterning of the ferrimagnetic phase is not necessarily required and heating the glass prior to introducing the organometallics constitutes a suitable method for promoting the organometallic-glass reaction.

Conversion of the bound organometallics in the glass to ferrimagnetic iron oxide or mixed ferrites is best accomplished simply by heating the glass in air. Some magnetic properties have been observed to result after very brief heating at temperatures of 720° C., with the amount of magnetization at these temperatures increasing with the duration of the heat treatment. However, best results in terms of ferrimagnetism are typically obtained if the impregnated glass is heated to a temperature sufficient to consolidate the porous glass. In the case of high-silica porous glasses temperatures on the order of 1200° C. are normally sufficient to achieve these results.

The nature of the atmosphere used during the heating and consolidation steps is not critical, although it has been found that slightly oxidizing conditions, as for example occur on heating in air, generally provide higher magnetization and hysteresis.

It has been found possible to affect the proportions of magnetite (Fe$_3$O$_4$) and gamma-Fe$_2$O$_3$ present in the glass by thermal treatments before or after consolidation. For example, the proportion of magnetite present in the glass can be increased by heating the glass in a reducing atmosphere comprising, for example, hydrogen, even after the glass has been consolidated at 1200° C. Temperatures and times utilized for such post-consolidation treatments are not critical, affecting only the extent to which the composition of the iron oxides present in the glass are modified. The formation of magnetite is normally accompanied by a change in color from reddish-brown to black, typically accompanied by a reduction in coercivity. These effects can be reversed and coercivity increased by treatments under comparable conditions of time and temperature in air.

The invention may be further understood by reference to the following detailed examples describing the preparation of magnetic materials in accordance therewith.

EXAMPLE I

A small plate of Corning Code 7930 porous glass, about 2.0 millimeters in thickness and having average pore diameter of about 0.005 microns, is positioned over a vessel containing a quantity of iron pentacarbonyl at 25° C. Vapor evolved from the liquid carbonyl under these conditions condenses on and within the pore structure of the porous glass to provide an essentially colorless, surface impregnated plate.

This plate is exposed to an ultraviolet light source consisting of an unfiltered 100-watt mercury arc lamp for an 8-minute exposure interval to photolyze the iron pentacarbonyl in the pore structure of the glass. Following this exposure, the glass is heated in air in an electric furnace at a rate of about 100° C./hr. to a temperature of 1200° C. and thereafter cooled to ambient temperature at the furnace rate. The effect of this treatment is to convert photolyzed iron carbonyl present in the glass to a yellow-orange reaction product identified as iron oxide or a mixture of iron oxides, and to consolidate the porous glass, thereby encapsulating the iron oxide in an impervious glass matrix.

The magnetic properties of the plate thus provided are evaluated using a Princeton Applied Research Vibrating Sample Magnetometer together with a 6" Varian electromagnet capable of generating a magnetic field of ±10,000 Oersted. The magnetization of the sample is measured by the magnetometer and plotted as a function of the applied magnetic field as that field is cycled over the full range. In the case of ferrimagnetic materials this procedure generates the well-known hysteresis loop.

FIG. 1 of the drawing shows a hysteresis loop resulting from the testing of a sample prepared in accordance with the above example utilizing the procedure above described. The horizontal axis of the loop corresponds to the applied magnetic field, in Oe, while the vertical axis measures the extent of magnetization of the sample under the applied field. The coercivity of the sample, defined as the half width of the hysteresis loop in Oe between the points of zero magnetization of the sample, is found to be about 5940 Oe as measured under these conditions. The magnetization of the sample in the 10,000 Oe field is found to be about 0.089 emu/g.

Figure 2:
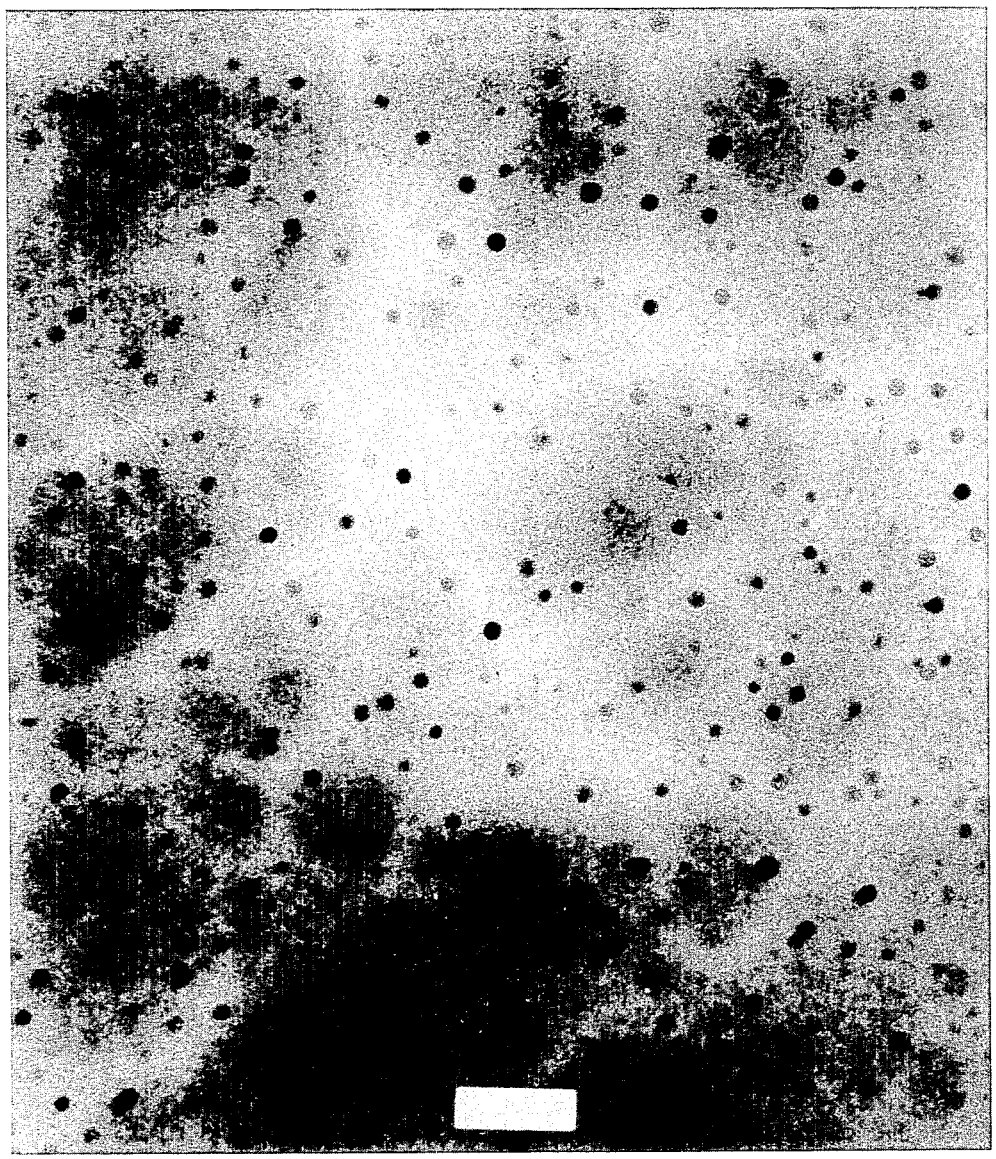
FIG. 2 is a transmission micrograph of a section of a ferrimagnetic material provided according to the invention.

The microstructure of a magnetic material produced in accordance with the procedure of the foregoing example is shown in FIG. 2 of the drawing. FIG. 2 is a transmission electron photomicrograph of such a sample wherein the white bar corresponds to a dimension of 0.1 microns. The small dark spots scattered throughout the field of the micrograph are believed to consist of iron oxide crystallites about 0.01–0.02 microns in diameter forming the magnetic phase of the material.

Because of the very small size of these crystallites, conclusive identification is not possible utilizing X-ray diffraction techniques. However, the appearance of the sample and the ferrimagnetic behavior of the material clearly suggest gamma-$Fe_2O_3$, $Fe_3O_4$, or a mixture or solid solution of the two.

Iron oxide-bearing materials produced in accordance with the general procedure described in Example I cannot in fact be magnetically saturated by the application of a field of 10,000 Oe at ambient temperatures and the magnitude of the field required for saturation at room temperature has not been determined. However both the saturation magnetization and the coercivity of such materials are strongly temperature dependent, decreasing rapidly at temperatures above ambient (but well below the Curie temperatures of the iron oxides) and increasing substantially at temperatures below ambient. This factor was used to further evaluate the magnetic behavior of these materials.

A series of experiments was performed to document the effects of temperature on the magnetization and coercivity of a second iron oxide-containing sample prepared generally in accordance with the procedure of Example I. This second sample was magnetized at temperatures above and below ambient, and also tested for coercivity at various temperatures after magnetization at selected temperatures. In some cases magnetization was accomplished using magnetic fields above 10,000 Oe, although the resulting magnetizations were thereafter measured at 10,000 Oe as described in Example I above.

The results of these experiments are reported in Table I below. Included in Table I are the magnetization temperature, in °C., the magnetizing field used for magnetization, in Oe, the measuring temperature or temperature at which magnetization and coercivity values were measured following magnetization, in °C., and the measured values of magnetization (at 10,000 Oe) and coercivity at the reported temperatures.

TABLE I

| Experiment No. | Magnetization Temp. (°C.) | Magnetizing Field (Oe) | Measurement Temp. (°C.) | Measured $M_{10k}$ (emu/g) | Measured $H_c$ (Oe) |
|---|---|---|---|---|---|
| 1 | 25 | 10,000 | 25 | 0.035 | 5696 |
| 2 | 25 | 22,000 | 25 | 0.046 | 9090 |
| 3 | 25 | 10,000 | 70 | 0.036 | 3744 |
| 4 | 25 | 10,000 | 100 | 0.034 | 749 |
| 5 | 25 | 10,000 | 150 | 0.031 | 64 |
| 6 | 25 | 18,000 | −120 | 0.042 | >10,000 |
| 7 | 120 | 10,000 | −120 | 0.067 | >>10,000 |

The data in Table I illustrate at least two points. First, magnetic saturation of this second sample is not achieved at room temperature in a 22,000 Oe field (Experiment 2), although saturation may be achieved using the procedure of Experiment 7, wherein the sample is subjected to a 10,000 Oe field at 120° C. and cooled in the field to below ambient temperatures.

Secondly, the coercivity of this sample is very strongly temperature dependent even at temperatures well below the Curie temperatures of the known ferrimagnetic iron oxides. Thus coercivity values can drop below 1000 Oe as temperatures are increased above about 70° C. For this reason, coercivity values recited in the foregoing specification and following claims are values as measured at 25° C., unless expressly noted to the contrary.

A hysteresis loop produced in accordance with Experiment 5 of Table I is very nearly closed, corresponding substantially to the applied field/magnetization behavior of a superparamagnetic material. It is therefore presently believed, without having been conclusively demonstrated, that the strong temperature dependence of the coercivity in these iron oxide-containing glasses is due to the strong temperature dependence of the superparamagnetic critical size.

The critical particle size for superparamagnetism is known to follow the expression:

$$r_c = [(\tfrac{3}{4}\pi)(25kT/K)]^{\frac{1}{3}}$$

wherein k is Boltzmann's constant, K is the intrinsic anisotropy constant for the material constituting the particle, and T is the absolute temperature. Thus, as the temperature is raised, the critical size increases and larger particles begin to exhibit superparamagnetic behavior.

Within the distribution of magnetic particle sizes produced in a glass according to the invention, that portion having radii above $r_c$ will exhibit ferrimagnetism and an open hysteresis loop, while that portion below $r_c$ in size will exhibit superparamagnetism and zero coercive field. The observed coercive field will thus depend on the relative numbers of the particles of each kind, a larger fraction of superparamagnetic particles decreasing the coercive field and vice versa. By raising the temperature the critical size for superparamagnetic behavior will increase, more particles will become superparamagnetic, and the coercive field will decrease.

In the case of ferrite-containing magnetic materials provided according to the invention, superparamagnetic behavior can be exhibited even at ambient temperatures, as illustrated by the following example.

EXAMPLE II

A small plate of Corning Code 7930 glass as in Example I, about 2 mm in thickness and having an average pore diameter of about 0.005 microns, is immersed in a $[Mn_2(CO)_{10}]$ solution consisting of 0.5 g. of the carbonyl in 10 ml. of $CH_2Cl_2$ for 10 minutes, and then removed. This immersion provides an essentially colorless sample impregnated throughout its volume with $[Mn_2(CO)_{10}]$.

The sample thus provided is exposed to an ultraviolet light source consisting of an unfiltered 100-watt mercury arc lamp for a 10-minute exposure interval to photolyze the manganese carbonyl present in the pores of the glass and to produce bonding to the pore walls. The glass sample is then heated to 200° C. for 10 minutes to expel any unreacted $[Mn_2(CO)_{10}]$ from the pores.

The sample is then positioned over a vessel containing a quantity of iron carbonyl $[Fe(CO)_5]$ at 25° C. for 5 minutes. Carbonyl vapors from the vessel condense on and within the pore structure of the glass to impregnate the glass with the compound. The glass is then re-exposed to ultraviolet light for 10 minutes to react the carbonyl with the glass.

Finally, the glass is heated in air at a rate of 100° C. to a temperature of 1225° C. and slowly cooled to room temperature. This heat treatment expels unreacted carbonyls and, later, all organic constituents from the glass, converting the metals in the glass to oxides, and ultimately consolidates the glass to encapsulate the oxide constituents within the pores.

Figure 3:
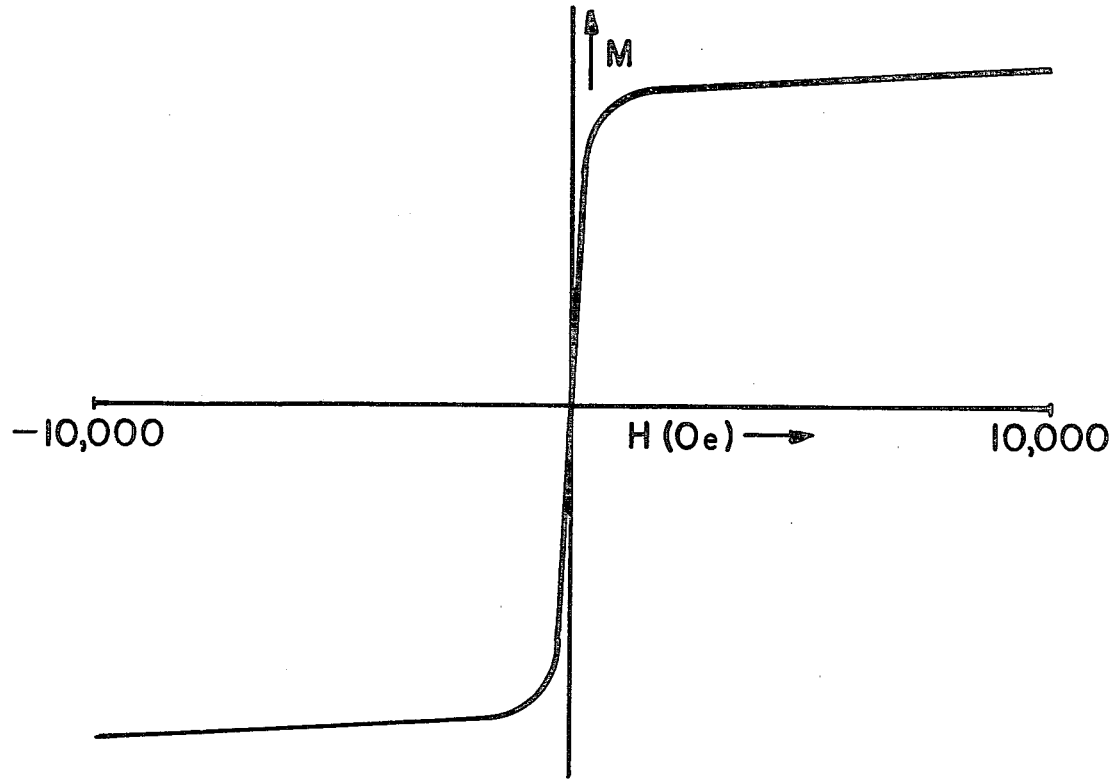
FIG. 3 illustrates the magnetization behavior of a superparamagnetic material provided according to the invention.

A magnetometer examination of the sample thus provided indicates strong superparamagnetic behavior at room temperature. FIG. 3 of the drawing is a plot of the magnetization M of such a sample as a function of the applied magnetic field H in Oe as the field is cycled over the range ±10,000 Oe. A typical magnetization value at 10,000 Oe (25°C.) for such a sample is 0.131 emu/g; at 120° C. this value drops to 0.095 emu/g.

The strong superparamagnetic properties shown by this sample are consistent with the relatively lower magnetocrystalline anisotropy of $MnFe_2O_4$. $NiFe_2O_4$- and $CoFe_2O_4$- containing glasses, which could be produced in a similar manner, would be expected to exhibit similar behavior. Thus the invention provides a useful way to make superparamagnetic materials by solid solution techniques.

We claim:

1. A ferrimagnetic material consisting of ferrimagnetic iron oxide crystallites dispersed in a glass matrix, the crystallites being selected from the group consisting of gamma-$Fe_2O_3$, $Fe_3O_4$, and mixtures or solid solutions thereof, said crystallites having a maximum diameter not exceeding about 0.05 microns and said material having a coercivity of at least about 1000 Oe at 25° C.

2. A method of making a ferrimagnetic material which comprises the steps of: impregnating a porous glass with an organometallic iron compound; reacting the iron compound with the pore walls of the porous glass at a temperature below the thermal decomposition temperature of the iron compound; and heating the glass to a temperature at least sufficient to expel unreacted iron compound from the glass and convert the iron in the glass to iron oxide.

3. A method in accordance with claim 2 wherein the porous glass is a 96% silica glass.

4. A method in accordance with claim 2 wherein the organometallic iron compound is an iron carbonyl.

5. A method in accordance with claim 4 wherein the organometallic iron compound is $[Fe(CO)_5]$.

6. A method in accordance with claim 2 wherein the organometallic compound is photolytically reacted with the pore walls of the porous glass.

7. A method in accordance with claim 2 wherein the glass is heated in air.

8. A method in accordance with claim 7 wherein the glass is heated to a temperature sufficient to convert the iron therein to iron oxide crystallites selected from the group consisting of gamma-$Fe_2O_3$, $Fe_3O_4$ and mixtures and solid solutions thereof.

9. A method in accordance with claim 7 wherein the glass is heated to a temperature sufficient to consolidate the pores thereof.

10. A method of making a superparamagnetic material which comprises the steps of: impregnating a porous glass with an organometallic iron compound and at least one compound selected from the group consisting of organometallic manganese, nickel and cobalt compounds; reacting the compounds with the pore walls of the porous glass at a temperature below the thermal decomposition temperatures of the compounds; and heating the glass to a temperature at least sufficient to expel unreacted organometallic compounds from the glass and to convert the metals therein to metal oxides.

11. A method in accordance with claim 10 wherein the glass is heated to a temperature sufficient to consolidate the pores of the glass.

* * * * *